Feb. 28, 1961 R. L. CRAIGLOW ET AL 2,973,420
OVEN
Filed Jan. 2, 1959 2 Sheets-Sheet 1

INVENTORS
ROBERT L. CRAIGLOW
LLOYD A. KEYSER
BY Moody and Phillion
ATTORNEYS

Feb. 28, 1961  R. L. CRAIGLOW ET AL  2,973,420
OVEN
Filed Jan. 2, 1959  2 Sheets-Sheet 2

INVENTORS
ROBERT L. CRAIGLOW
LLOYD A. KEYSER
BY
Moody and Phillips
ATTORNEYS

United States Patent Office 2,973,420
Patented Feb. 28, 1961

2,973,420

OVEN

Robert L. Craiglow and Lloyd A. Keyser, Cedar Rapids, Iowa, assignors to Collins Radio Company, Cedar Rapids, Iowa, a corporation of Iowa Filed Jan. 2, 1959, Ser. No. 784,578

15 Claims. (Cl. 219—19)

This invention relates to temperature control ovens and more particularly to a two stage temperature control oven employing but a single temperature control element and a single power control circuit for controlling the power supplied to both stages of said oven.

It is often found necessary to control temperature within close tolerances. For example, in the electrical art it frequently is necessary to control the temperature of certain electrical components whose characteristics will otherwise vary undesirably. This is true, in some instances, of crystals employed as frequency control means in some electrical systems, since the frequency of the crystals will vary with temperature changes. Depending upon the degree of frequency control desired, a single stage or a double stage oven, both well known in the prior art, can be employed. Single stage ovens are available which will control temperature within less than one degree centigrade tolerance with ambient temperature changes of about a hundred degrees centigrade. A two stage oven will control temperature within less than a hundredth of a degree for a change of one hundred degrees in the ambient temperature. This can be understood more easily when it is noted that in a two stage oven having an inner oven enclosed within an outer oven, the temperature within the outer oven appears as the ambient temperature to the inner oven. As an illustration, assume that the temperature within the outer oven can be controlled to within a one degree variation with a hundred degree variation in room atmosphere. Now, if the inner oven is equally accurate, it follows that the temperature within the inner oven can be controlled within about one one-hundredths degree variation with a change of one degree within the outer oven. Consequently, a change of one hundred degrees in room temperature will produce a temperature change of about only one one-hundredths degree within the inner oven.

Although it is apparent from the above that two stage ovens are capable of controlling temperatures within close tolerances, past embodiments have required two separate heating elements, one for the outer oven and one for the inner oven, two separate temperature sensing elements, one for each oven, and two power control circuits, one for each oven.

It is a characteristic of two stage ovens employing a separate temperature sensing element in each oven that the temperature of the outer oven must be kept at least three to five degrees below the temperature of the inner oven. The need for this temperature difference is more apparent when it is noted that if the temperature of the outer oven were to exceed the desired temperature within the inner oven by a degree or two, the temperature of the inner oven would necessarily rise above the desired value. On the other hand it is desirable that the temperature within the outer oven be as close as possible to the desired temperature within the inner oven, since it is thereby easier to maintain the desired temperature level within the inner oven.

It is an object of the present invention to provide a two stage oven employing but one temperature sensing element and one power control circuit to supply heat to both ovens.

Another object of the invention is to provide a two stage oven in which the temperature within the outer oven can be substantially the same as the desired temperature of the inner oven.

Other purposes of the invention are to provide an inexpensive and reliable two stage oven, a two stage oven with only a single temperature adjustment and to improve two stage ovens generally.

In accordance with the invention there is provided, in a multiple stage oven comprising an inner oven and outer oven enclosing said inner oven, a first heater means for heating said inner oven, and a second heater means for heating said outer oven. A power control circuit is provided to supply power to the first and second heater means, said first and second heater means being connected either in series or parallel. Temperature sensing means is constructed to respond to the temperature of said inner oven to control the power control circuit and thereby the amount of energy supplied to said first heater means from said power control circuit. Since the second heater means is connected either in parallel or series with the first heater element, the amount of energy supplied to the second heater element will vary as the amount of energy supplied to the first heater element varies. Thus, control of both outer and inner oven temperatures is effected by one temperature sensing element and one power control circuit.

These and other objects and features will be understood more fully from the following detailed description of the invention when read in conjunction with the drawings in which.

It is to be noted that corresponding elements in the various figures will be designated by the same reference character (although primed in succeeding figures).

Figure 1:
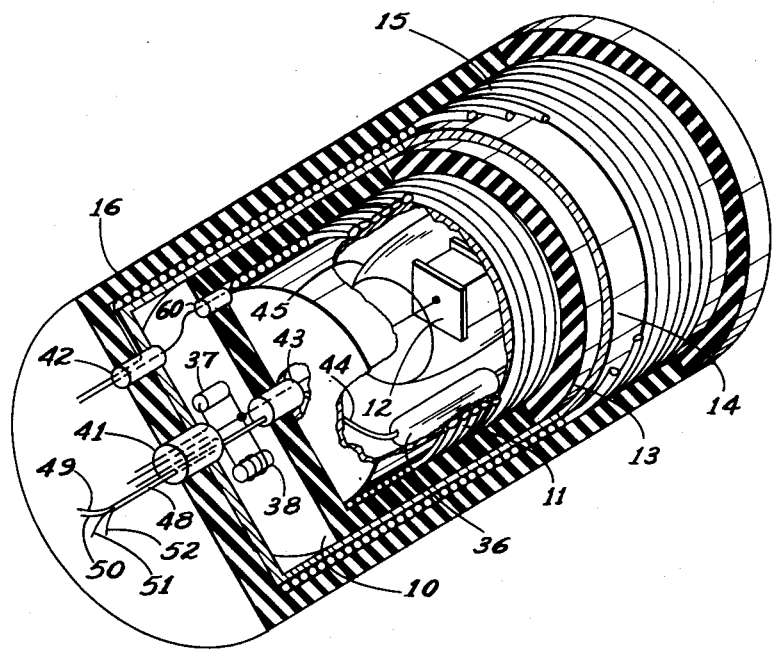
Fig. 1 shows a perspective view of the invention with portions thereof broken away.

Referring now to Fig. 1 the inner oven is comprised of the metal container or can 10 around which is wound a heater winding 11. The crystal 12, whose temperature is to be controlled, is enclosed within the can 10. Ordinarily the crystal 12 is encased within a glass envelope 45 which fits inside the metal can 10. In order to obtain as nearly uniform heat distribution as possible within the inner oven, the can 10 is composed of a good heat conducting material, such as copper, for example. The temperature is sensed by some temperature sensitive element 36 which can receive any necessary operating power from the power supply 47 shown in Fig. 2.

The outer oven now will be described. Specifically, the outer oven comprises a layer of thermal insulation 13, which may be foam rubber or other suitable insulation, a metallic container or can 14, a heater winding 15 and another layer of thermal insulation 16. The layer of insulation 13 as can be seen from the drawings, completely encloses the inner oven, including the ends thereof. Similarly the metal container 14 completely encompasses the insulation layer 13. As in the case of the container 10, the container 14 is composed preferably of a material having a high heat conductivity. Around the container 14 is wound the heater winding 15, and around the heater winding 15 is a heat insulation 16 which also covers the ends of the cylindrically shaped oven structure. It is to be noted that oven shapes other than cylindrical may be employed in the invention.

Sometimes it is desirable to locate elements associated with the crystal 12 within the outer oven but outside the inner oven. Such desirability may be due to temperature considerations or to avoid unwanted lead capacitance or lead inductance. Elements 37 and 38 are representative of such elements and, as will be discussed later, produce heat which enters into design considerations. The leads from crystal 12, elements 37 and 38, and temperature sensing element 36 are brought out through the outer oven by means of a plug 41 into which the leads are embedded. Plug 41 should have good electrical and thermal insulative properties. Plug 43 and plugs 60 and 42, which also should have good thermal properties, function respectively to bring out through the inner oven the crystal 12 lead-in wire 44 and the temperature sensing element lead wires 49, 50, 51, and 52 and to bring out through the inner and outer ovens an end terminal of both the heater winding 15 and the heater winding 11.

It is to be noted that for convenience the temperature sensing element lead wires 49, 50, 51, and 52 are shown in cable form 48 when passing through plugs 43 and 41. A fourth similar plug means (not specifically shown) can be employed to bring out through the outer oven the other end terminals of heater elements 15 and 11.

Figure 2:
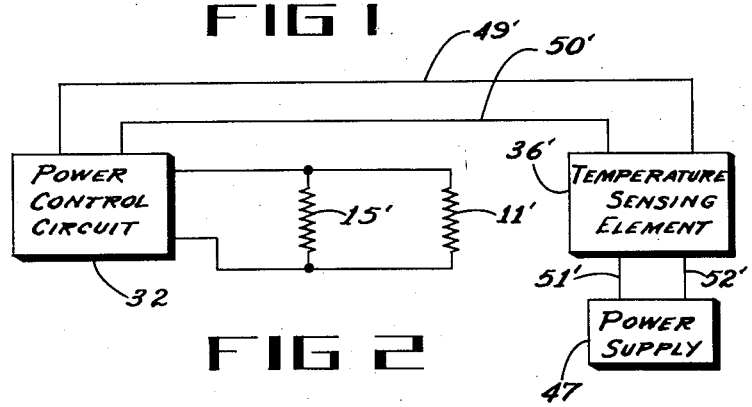
Fig. 2 shows one form of the electrical portion of the structure of Fig. 1.

The heater winding 15 of Fig. 1 can be connected in the electrical circuit of the oven in a manner as shown in Fig. 2 wherein said heater winding is designated by the reference character 15'. It can be seen from Fig. 2 that the winding 15' is connected in parallel with the inner oven heater winding 11' with respect to the power control means 32. Thus, the power supplied to the outer heater winding 15' will vary in accordance with the power supplied to the inner heater 11'. If the temperature within the inner oven becomes too low, the sensing element 36' will cause the power control circuit 32 to provide more power to inner oven heater 11'. When more power is supplied to the inner oven, more power also will be delivered to the heater winding 15' of the outer oven, thus increasing the temperature level within the outer oven. Conversely, should the sensing element 36' indicate a need for a reduced power input thereto, the power supplied to the heater winding 15' of the outer oven also will be reduced, thus reducing the temperature within both the inner and outer oven.

It perhaps will appear that due to the insulation between the outer oven and the inner oven, a change in temperature in the outer oven will produce a delayed change in the temperature in the inner oven, thus creating a hunting effect. It has been found, however, that hunting can be avoided by keeping the ratio of the power supplied to the outer oven to the power supplied to the inner oven sufficiently low. More specifically, the ratio of the amounts of power supplied to the outer oven and the inner oven should be such that the resultant change of temperature in the outer oven is relatively slow compared with the corresponding change of temperature in the inner oven. The prior statements may become clearer by a specific example. Assume that the atmosphere of the room in which the oven is located is 20° C. Assume further that with such an atmospheric temperature the temperature of the outer oven is 67° C. and the temperature of the inner oven is 70° C. (the desired temperature). Also assume that both of the ovens will control temperature to one percent of ambient temperature change. Now if the outer oven temperature should drop to 66° C., the inner oven temperature will decrease to about 69.99° C. and the bridge circuit of the inner oven will call for more power. As the power is supplied to the inner oven power also will be supplied to the heater 15' of the outer oven. However, the ovens are designed so that the temperature of the inner oven will rise one one-hundredths of a degree to a level of 70° C. (at which time the bridge will be balanced again) before the temperature of the outer oven will rise one degree C. to 67° C. It can be seen, therefore, that with proper design the temperature of the outer oven will not be likely to cause overshoot of the temperature of the inner oven, thus avoiding hunting.

On the other hand, if the ratio of the power supplied to the outer oven as compared with the power supplied to the inner oven is too large, the temperature increase or decrease of the outer oven also will be too large, thus causing overshoot of the temperature of the inner oven, so that hunting probably will be introduced. The correct ratio of outer oven power to inner oven power is not a constant ratio but will vary with the particular design characteristics of any given oven. For example, if the heat loss in the outer oven is large, the power ratio could be greater than the case where the heat loss of the outer oven were less. Similarly, the power ratio can be increased or decreased in accordance with a decrease or increase respectively of heat loss in the inner oven. For a well designed oven it would appear that this power ratio should be of the order of 4 to 8. It is to be understood, however, that the invention is not limited to power ratios of the order of 4 to 8 since with any particular oven the power ratio could vary considerably.

Figure 3:
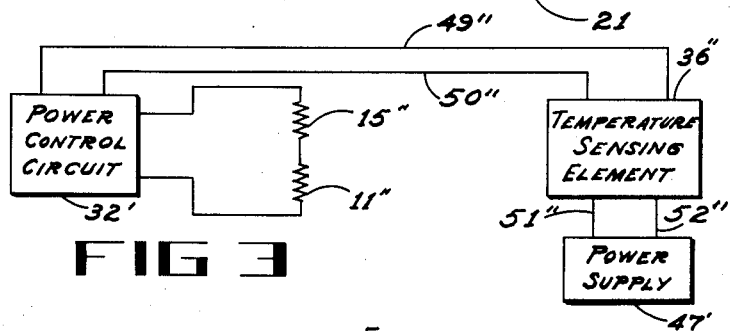
Fig. 3 shows another form of the electrical portion of the structure of Fig. 1.

Another form of the invention is shown in Fig. 3. The inner and outer oven heater windings 11'' and 15'' are connected in series arrangement rather than in parallel arrangement as shown in Fig. 2. The temperature sensing element 36'', however, is responsive directly only to the inner oven temperature. It can be seen that as a decreased or increased amount of heat is required by the inner oven a corresponding decrease or increase of heat will also be supplied to the outer oven winding.

Figure 4:
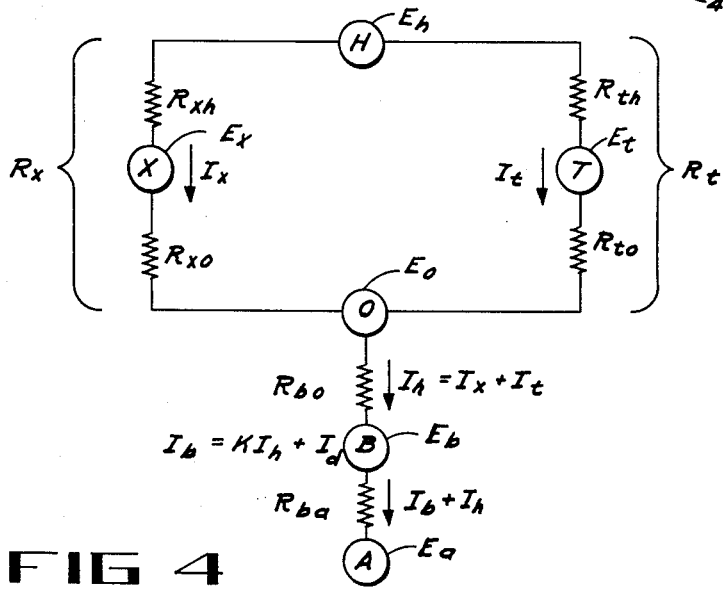
Fig. 4 shows the heat transfer characteristics of the oven in terms of an electrical circuit analogy.

An analysis of the heat transfer characteristics of the oven of the present invention will now be described. Fig. 4 shows an electrical analogy to the heat transfer characteristic of the oven. In this analogy the current, designated as I with various subcharacters, represents heat flow, and resistance (thermal insulation) to such heat flow is represented by the various "R's" which in the electrical analogy would be resistors. Points in the circuit are designated by the circled letters X, H, T, O, B, and A and are defined individually in the following descriptive material. $E_x$, $E_h$, $E_t$, $E_o$, $E_b$ and $E_a$ represent the temperature levels of points X, H, T, O, B, and A respectively and correspond to voltage levels in the electrical analogy.

It should be noted at the outset that the electrical analogy is not a completely accurate representation of the heat transfer characteristics of the oven but is sufficiently accurate to illustrate a reasonably close approximation of the operation of the oven.

In Fig. 4 the reference character H represents the heat source consisting of the inner oven heater 11. The heat from source H flows in two parallel paths. The first of these paths may be traced through a heat resistance $R_{th}$ to the temperature sensing element T, through heat resistance $R_{to}$, which is a small resistance, to O which is the inner oven container 10 of Fig. 1 and which has a temperature $E_o$. The other of the two parallel paths may be traced from heat source H through a resistor $R_{xh}$ to the crystal X, which is represented by the temperature level $E_x$ in Fig. 3, and then through a resistor $R_{xo}$ to the inner oven container 10. The heat resistor $R_{xh}$ represents the resistance from heat source H to the crystal X. The resistor $R_{xo}$ is largely comprised of the conductors leading to the crystal.

The heat resistor $R_{bo}$ represents the insulating layer 13 (Fig. 1). The circled letter B represents the container 14 of the outer oven which has a temperature $E_b$. In Fig. 1 it will be noted that there is a space between the insulating layer 13 and the outer oven container 14 in which may be placed a number of circuit components such as components 37 and 38 which operate in conjunction with the crystal 12 contained within the inner oven. These additional circuit components may dissipate heat. The additional heat flow introduced by these components is designated by the reference character $I_d$. Also introduced in the outer oven is the heat from the outer oven heating winding 15. This latter quantity of heat is represented by the term $KI_h$ where K represents the ratio of the heat supplied to the outer oven heater winding as compared with the heat supplied to the inner oven heater winding. The over-all heat generated within the outer oven is then equal to the sum of $KI_h$ and $I_d$ which is designated as $I_b$. The heat resistor $R_{ba}$ represents the insulating layer 16 of Fig. 1 and the circled letter A represents the outside atmosphere.

Due to its characteristics and to the feedback circuit to the power control circuit associated therewith, the temperature of the sensing element T will be maintained at a constant level $E_t$. If the ratio of $$\frac{R_{xh}}{R_{xo}}$$

is maintained equal to the ratio of $$\frac{R_{th}}{R_{to}}$$

in the bridge circuit of Fig. 4, which bridge circuit includes $R_{xh}$, $R_{xo}$, $R_{th}$, and $R_{to}$, then said bridge circuit will be balanced and the temperature $E_x$ of the crystal X will be maintained at the same constant temperature as that of the sensing element T. This is an ideal situation which in practice is not completely attainable. However, it can be approximated with reasonable accuracy. With the foregoing assumptions, the following expressions can be written:

(1) $\quad E_t = E_a + (I_b + I_h)R_{ba} + I_h R_{bo} + I_t R_{to}$ (2) $\quad E_x = E_a + (I_b + I_h)R_{ba} + I_h R_{bo} + I_x R_{xo}$ (3) $\quad \dfrac{I_x}{I_t} = \dfrac{R_t}{R_x}$ Where $E_t$ is the temperature of the sensing elements, $E_a$ the temperature of the room atmosphere, $I_x$ is the heat flowing through the crystal branch, $I_t$ is the heat flowing through the sensing element branch, and $I_h$ is equal to $I_x + I_t$. $E_x$, $I_b$, K and $I_d$ have been defined hereinbefore. From the above relationships the following expression can be derived:

(4) $\quad \dfrac{dE_x}{dE_a} = \dfrac{R_{to}R_x - R_{xo}R_t}{[(K+1)R_{ba} + R_{bo}](R_t + R_x) + R_{to}R_x}$ In the above expression it can be seen that the rate of change of the crystal temperature $E_x$ can be made smaller by increasing the value of the power ratio K and also by increasing $R_{ba}$ and $R_{bo}$. It will also be observed that the smaller the numerator of Expression 4, the greater will be the temperature control. Close examination of the said numerator will reveal that its magnitude decreases as the bridge circuit of Fig. 4 becomes more balanced. For reasons discussed hereinbefore K should not be made too large.

Another factor in designing the oven is the change in crystal temperature E with changes in the quantity of heat I introduced in the outer oven by additional components. The following expression can be derived illustrating this relationship:

(5) $\quad \dfrac{dE_x}{dI_a} = R_{ba}\left[1 - \dfrac{[(K+1)R_{ba} + R_{bo}](R_t + R_x) + R_{xo}R_t}{[(K+1)R_{ba} + R_{bo}](R_t + R_x) + R_{to}R_x}\right]$ It will be observed that in order to minimize the change of crystal temperature the value of K should be large but here it can be seen that it is desirable to have the ratio $$\frac{R_{bo}}{R_{ba}}$$

large.

From a consideration of both Expressions 4 and 5, certain over-all conclusions can be determined. Specifically, in order to increase the sensitivity of the oven, the value of the power ratio K should be large (a ratio of the order of from 4 to 8 has been found suitable), the value of $R_{bo}$ and the value of $R_{ba}$ both should be made very large compared to the other heat resistors in the system with $R_{bo}$ being considerably larger than $R_{ba}$. Additionally the bridge comprising heat resistors $R_{xh}$, $R_{xo}$, $R_{th}$, and $R_{to}$ should be balanced as accurately as possible.

Figure 5:
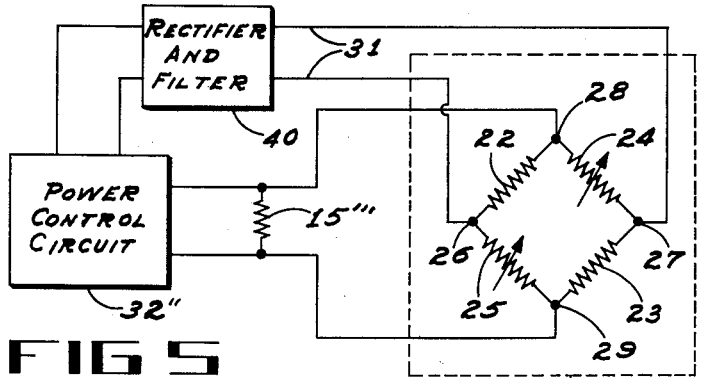
Fig. 5 shows a schematic sketch of a third form of the electrical portion of the invention.

In another embodiment of the invention as shown in Fig. 5 the heater winding 11 is a bridge circuit as shown within the block 21 of Fig. 2 and is comprised of resistors 22, 23, 24, and 25. Resistors 22 and 23 are of a material having a very low temperature coefficient of resistance and resistors 24 and 25 are of a material having a relatively high temperature coefficient of resistance. Further, the values of the resistors 22 through 25 are selected so that at a desired temperature, as for example the desired temperature of the crystal, the bridge will be balanced. Thus, no voltage will appear across the output terminals 26 and 27 when a voltage is applied across the input terminals 28 and 29. It will be apparent that when the temperature of the bridge falls below or rises above the predetermined temperature, a voltage signal indicative thereof will be produced across the output terminals 26 and 27 and will be supplied back to the amplifier oscillator through the rectifier-filter means 40.

It is to be noted that the output signal of the power control amplifier circuit 32'' usually is an A.C. signal. Consequently the signal appearing across the bridge circuit output terminals 26 and 27 also would be an A.C. signal. It is desirable, however, to have a D.C. signal to control the output of the power control circuit 32'', also referred to herein as an amplifier oscillator circuit. In order to derive such a D.C. signal of proper polarity there is provided rectifier-filter means 40. The magnitude of the D.C. signal produced by the rectifier-filter means 40 varies as the magnitude of the signal appearing across the bridge output terminals 26 and 27 and is supplied to the amplifier oscillator 32. The amplifier oscillator 32 is constructed to respond thereto to increase or decrease the amount of power supplied to the bridge circuit 21 to correct the temperature thereof to the desired level.

It is to be understood that the forms of the invention described herein are but preferred embodiments thereof and that various changes in materials, over-all configurations, and general design may be made without departing from the spirit or scope of the invention.

We claim:

1. A multistage oven comprising an inner oven, an outer oven enclosing said inner oven, first heating means for said inner oven, second heating means for said outer oven, power control means constructed and arranged to supply energy to said first and second heater means in a constant ratio, and temperature sensing means responsive to the inner oven temperature to control the amount of energy supplied to said first heating means from said power control means.

2. A multistage oven in accordance with claim 1 in which said first and second heating means are connected in series arrangement.

3. A multistage oven in accordance with claim 1 in which said first and second heating means are connected in parallel arrangement.

4. A multistage oven comprising an inner oven, an outer oven enclosing said inner oven, first heater means to heat said inner oven, second heater means to heat said outer oven, power control means constructed and arranged to supply heat to said first and second heater means in a constant ratio, and temperature sensing means for sensing the inner oven temperature, said power control means constructed to respond to said temperature sensing means to supply an amount of energy to said heater means to maintain the temperature of the temperature sensing means substantially constant.

5. A multistage oven in accordance with claim 4 in which said first and second heating means are connected in series arrangement.

6. A multistage oven in accordance with claim 4 in which said first and second heater means are connected in parallel arrangement.

7. A multistage oven in accordance with claim 4 in which said first heater means comprises a bridge circuit having four resistive legs, at least one of said four resistive legs being of a material having a high temperature coefficient of resistance, and the remainder of said resistive legs being of a material having a low temperature coefficient of resistance, said bridge circuit being balanced when at a predetermined temperature, said power control means being constructed to respond to unbalance of said bridge circuit to supply to said bridge circuit an amount of power calculated to balance said bridge circuit.

8. A multistage oven in accordance with claim 7 in which said second and first heater means are constructed to generate heat in a ratio which is less than the ratio of heat loss of said outer oven to the heat loss of said inner oven.

9. A multiple stage oven comprising an inner oven, an outer oven, and power control means constructed to produce an A.C. output signal, said inner oven including first heater means and temperature sensing means constructed to respond to the temperature of said inner oven to produce an output signal indicative thereof, means for supplying the output signal of said power control means to said first heater means, rectifier means responsive to the output signal of said temperature sensing means to produce a D.C. signal whose magnitude and polarity indicate the amount and direction of temperature deviation of said temperature sensing element from a predetermined nominal temperature, said power control means constructed to respond to the output signal of said rectifier means of said temperature sensing means to supply sufficient output signal to said first heater means to maintain said temperature sensing means at said predetermined nominal temperature, said outer oven means comprising second heater means connected with respect to said first heater means and said power control means to receive energy the amount of which varies directly with the amount of energy received by said first heater means.

10. A multiple stage oven in accordance with claim 9 in which said first heater means comprises a bridge circuit having four resistive legs, at least one of said four resistive legs being of a material having a high temperature coefficient of resistance, and the remainder of said resistive legs being of a material having a low temperature coefficient of resistance, said bridge circuit being balanced when at said nominal temperature, said power supply being constructed to respond to unbalance of said bridge circuit to supply to said bridge circuit an amount of power calculated to balance said bridge circuit.

11. A multistage oven in accordance with claim 9 in which said second and first heater means are constructed to generate heat in a ratio which is less than the ratio of heat loss of said outer oven to the heat loss of said inner oven.

12. A multiple stage oven for maintaining an object at a near constant temperature comprising an inner oven, an outer oven surrounding said inner oven, and a power supply means, said inner oven comprising a first substantially closed container of a high heat conductivity material, first heater means wound around said first container, said first heater means comprising a bridge circuit having a pair of input terminals, a pair of output terminals, and four resistive elements each comprising a leg of said bridge circuit, a given pair of diametrically positioned resistive elements of the said four resistive elements being composed of a material having a relatively high temperature coefficient of resistance, and the remaining pair of resistive elements having a low temperature coefficient of resistance compared to that of said pair of diametrically opposed resistive elements, said bridge circuit constructed to be balanced at a predetermined nominal temperature, said outer oven comprising a layer of heat insulative material around said inner oven, a second substantially closed container of a high heat conductivity material, second heater means wound around said second closed container, and a second layer of insulative material enclosing said second closed container and said second heater means, said second heater means being connected across the input terminals of said first heater means, means for supplying the output of said power supply means to the input terminals of said first heater means, said power supply means being responsive to the output signal appearing across the output terminals of said bridge circuit to vary the amount of power supplied to said bridge circuit accordingly.

13. A multistage oven in accordance with claim 12 in which said second and first heater means are constructed to generate heat in a ratio which is less than the ratio of heat loss of said outer oven to the heat loss of said inner oven.

14. A multiple stage oven for maintaining an object at a near constant temperature comprising an inner oven enclosing said object, an outer oven surrounding said inner oven, and a power supply means, said inner oven comprising a first substantially closed container of a high heat conductivity material, and a first heater element wound around the first container, said heater element comprising a bridge circuit having a pair of input terminals, a pair of output terminals, and four impedance elements each comprising a leg of said bridge circuit, at least one of said four impedance elements being composed of a material having a high temperature coefficient of resistance, and the remaining impedance elements having a low temperature coefficient of resistance, said bridge circuit constructed to be balanced at a predetermined temperature, said outer oven comprising a layer of heat insulative material around said inner oven, a second substantially closed container of a high heat conductivity material, a second heater element wound around said second closed container, and a second layer of insulative material enclosing said second closed container and said second heater element, said second heater element being connected across the input terminals of said first heater element, means for supplying the output of said power supply means to the input terminals of said first heater element, said power supply means being responsive to the output signal appearing across the output terminals of said bridge circuit to vary the amount of power supplied to said bridge circuit accordingly.

15. A multistage oven in accordance with claim 14 in which said second and first heater elements are constructed to generate heat in a ratio which is less than the ratio of heat loss of said outer oven to the heat loss of said inner oven.

References Cited in the file of this patent

UNITED STATES PATENTS

| | | |
|---|---|---|
| 1,898,531 | Gebhard et al. | Feb. 21, 1933 |
| 1,967,184 | Clapp et al. | July 17, 1934 |
| 2,438,345 | Miller | Mar. 23, 1948 |
| 2,586,686 | Medlock | Feb. 19, 1952 |
| 2,858,407 | Hykes | Oct. 28, 1958 |